United States Patent
Meler et al.

(10) Patent No.: US 9,747,667 B1
(45) Date of Patent: Aug. 29, 2017

(54) SYSTEMS AND METHODS FOR CHANGING PROJECTION OF VISUAL CONTENT

(71) Applicant: GOPRO, INC., San Mateo, CA (US)

(72) Inventors: Antoine Meler, Chapereillan (FR); Benoit Fouet, Montbonnot (FR); Yann Gilquin, Chambery (FR)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/280,910

(22) Filed: Sep. 29, 2016

(51) Int. Cl.
*G06T 17/00* (2006.01)
*G06T 3/40* (2006.01)
*G06T 3/00* (2006.01)
*G06T 9/00* (2006.01)

(52) U.S. Cl.
CPC .......... *G06T 3/4084* (2013.01); *G06T 3/0056* (2013.01); *G06T 9/00* (2013.01); *G06T 2207/20048* (2013.01); *G06T 2207/20172* (2013.01)

(58) Field of Classification Search
None
See application file for complete search history.

(56) References Cited

U.S. PATENT DOCUMENTS

| | | | |
|---|---|---|---|
| 6,243,099 B1 | 6/2001 | Oxaal | |
| 9,264,598 B1 | 2/2016 | Baldwin | |
| 9,609,212 B2 | 3/2017 | Takenaka | |
| 2008/0074500 A1 | 3/2008 | Chen | |
| 2009/0010567 A1 | 1/2009 | Akiba | |
| 2010/0097444 A1 | 4/2010 | Lablans | |
| 2011/0063421 A1 | 3/2011 | Kubota | |
| 2011/0115806 A1* | 5/2011 | Rogers | G06T 9/00 345/582 |
| 2011/0168475 A1 | 7/2011 | Moser | |
| 2011/0249001 A1* | 10/2011 | Kameyama | G06F 17/16 345/428 |
| 2011/0255802 A1* | 10/2011 | Kameyama | G06K 9/00275 382/278 |
| 2013/0013185 A1 | 1/2013 | Smitherman | |
| 2013/0100132 A1 | 4/2013 | Katayama | |
| 2015/0173715 A1 | 6/2015 | Raghavan | |

* cited by examiner

*Primary Examiner* — Martin Mushambo
(74) *Attorney, Agent, or Firm* — Sheppard Mullin Richter & Hampton LLP

(57) ABSTRACT

First visual information defining the visual content in a first projection may be accessed. Second visual information defining lower versions of the visual content in the first projection may be accessed. A transformation of the visual content from the first projection to a second projection may be determined. The transformation may include a visual compression of a portion of the visual content in the first projection. The portion may be identified. An amount of the visual compression of the portion may be determined. One or more lower resolution versions of the visual content may be selected. The visual content may be transformed using the one or more lower resolution versions of the visual content.

20 Claims, 8 Drawing Sheets transformed spherical visual content A 500 transformed spherical visual content B 700

$$J(x,y) = \begin{bmatrix} \frac{dx_2}{dx_1} & \frac{dx_2}{dy_1} \\ \frac{dy_2}{dx_1} & \frac{dy_2}{dy_1} \end{bmatrix}$$

FIG. 8A

$$\det(J(x,y)) = \frac{dx_2}{dx_1} \times \frac{dy_2}{dy_1} - \frac{dx_2}{dy_1} \times \frac{dy_2}{dx_1}$$

FIG. 8B

SYSTEMS AND METHODS FOR CHANGING PROJECTION OF VISUAL CONTENT

FIELD

This disclosure relates to systems and methods that changes projection of visual content using visual compression.

BACKGROUND

Video applications may allow a user to change projection of visual content. Changing projection of visual content may include visual compression of the visual content. Visual compression of the visual content may create artifacts (e.g., aliasing) in the visual content.

SUMMARY

This disclosure relates to changing projection of visual content using lower resolution versions of the visual content. First visual information defining the visual content in a first projection may be accessed. Second visual information defining lower versions of the visual content in the first projection may be accessed. A transformation of the visual content from the first projection to a second projection may be determined. The transformation may include a visual compression of a portion of the visual content in the first projection. The portion may be identified. An amount of the visual compression of the portion may be determined. One or more lower resolution versions of the visual content may be selected. The visual content may be transformed using the one or more lower resolution versions of the visual content.

A system that changes projection of visual content may include one or more physical processors, and/or other components. Visual content may refer to media content that may be observed visually. Visual content may include one or more of an image, a sequence of images, a frame of a video, a video, and/or other visual content.

The physical processor(s) may be configured by machine-readable instructions. Executing the machine-readable instructions may cause the physical processor(s) to facilitate changing projection of visual content using lower resolution versions of the visual content. The machine-readable instructions may include one or more computer program components. Computer program components may include one or more of an access component, a transformation determination component, a visual compression component, a selection component, a transformation component, and/or other computer program components. In some implementations, the computer program components may further include a generation component.

The access component may be configured to access one or more visual information defining visual content. Visual information may define the visual content in a particular projection. The visual content may include one or both of an image and/or a video. The access component may access first visual information, second visual information, and/or other visual information. The first visual information may define the visual content in a first projection. The second visual information may define one or more lower resolution versions of the visual content in the first projection. In some implementations, the first projection may include an equirectangular projection and/or other projections.

In some implementations, one or more lower resolution versions of the visual content may be stored in one or more mipmaps. In some implementations, the generation component may be configured to generate one or more lower resolution versions of the visual content in one or more projections. The generation component may generate one or more lower resolution versions of the visual content in the first projection.

The transformation determination component may be configured to determine a transformation of the visual content from one projection to another. The transformation component may determine a transformation of the visual content from the first projection to a second projection. The transformation of the visual content from the first projection to a second projection may be characterized by a transform function and/or other information. The transformation of the visual content from the first projection to the second projection may include one or more visual compressions of one or more portions of the visual content in the first projection. In some implementations, the second projection may include a stereographic projection and/or other projections.

The visual compression component may be configured to identify the one or more portions of the visual content in the first projection. The visual compression component may be configured to determine an amount of visual compression of the one or more portions of the visual content in the first projection.

The selection component may be configured to select one or more of the lower resolution versions of the visual content for the visual compression of the one or more portions. One or more lower resolution versions of the visual content may include one or more lower resolution versions of the portion(s) of the visual content in the first projection. One or more lower resolution versions of the visual content selected for the visual compression of the one or more portions may include a first version having a first resolution, a second version having a second resolution, and/or other versions. The first resolution may be greater than the second resolution.

One or more lower resolution versions of the visual content may be selected based on the amount of the visual compression of the one or more portions and/or other information. In some implementations, one or more lower resolution versions of the visual content may be selected based on a determinant of a Jacobian matrix of the transform function. In some implementations, one or more lower resolution versions of the visual content may be selected based on a first singular value and a second singular value of the Jacobian matrix of the transform function.

The transformation component may be configured to transform the visual content from the first projection to the second projection. The visual content may be transformed from the first projection to the second projection using one or more of the lower resolution versions of the portion(s) of the visual content selected for the visual compression of the portion(s), and/or other information. In some implementations, the visual compression of the portion(s) may include an interpolation of the first version of the lower resolution versions of the visual content, the second version of the lower resolution versions of the visual content, and/or other versions of the lower resolution versions of the visual content.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 8A illustrates a Jacobian matrix of a transform function.

FIG. 8B illustrates a determinant of the Jacobian matrix in FIG. 8A.

DETAILED DESCRIPTION

Figure 1:
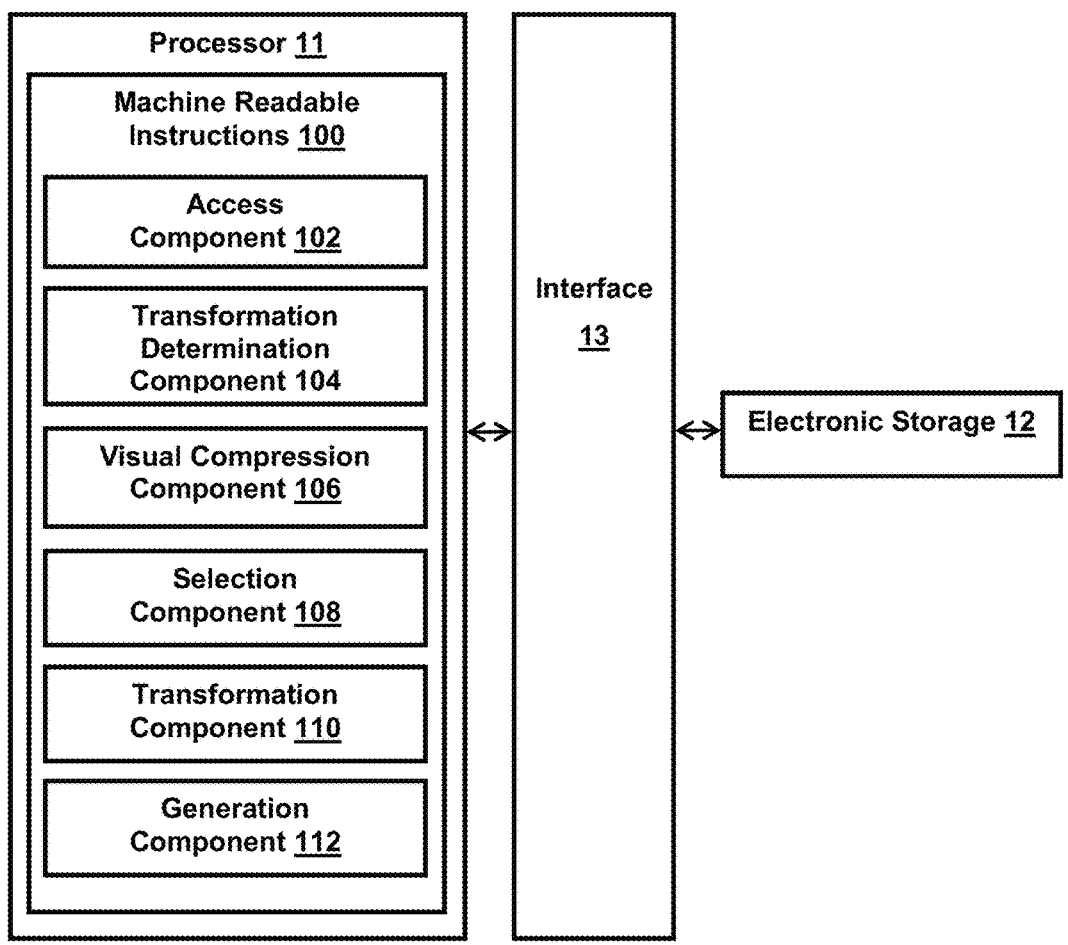
FIG. 1 illustrates a system for changing projection of visual content using lower resolution versions of the visual content.

FIG. 1 illustrates system 10 for changing projection of visual content using lower resolution versions of the visual content. System 10 may include one or more of processor 11, electronic storage 12, interface 13 (e.g., bus, wireless interface, etc.), and/or other components. First visual information defining the visual content in a first projection may be accessed. Second visual information defining lower versions of the visual content in the first projection may be accessed. A transformation of the visual content from the first projection to a second projection may be determined. The transformation may include a visual compression of a portion of the visual content in the first projection. The portion may be identified. An amount of the visual compression of the portion may be determined. One or more lower resolution versions of the visual content may be selected. The visual content may be transformed using the one or more lower resolution versions of the visual content.

Electronic storage 12 may include electronic storage medium that electronically stores information. Electronic storage 12 may store software algorithms, information determined by processor 11, information received remotely, and/or other information that enables system 10 to function properly. For example, electronic storage 12 may store information relating to visual content, visual information, transformation of visual content, projections for visual content, visual compression, lower resolution versions of visual content, transformation of visual content, and/or other information.

Processor 11 may be configured to provide information processing capabilities in system 10. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured to execute one or more machine readable instructions 100 to facilitate changing projection of visual content using lower resolution versions of the visual content. Machine-readable instructions 100 may include one or more computer program components. Machine readable instructions 100 may include one or more of access component 102, transformation determination component 104, visual compression component 106, selection component 108, transformation component 110, and/or other computer program components. In some implementations, machine readable instructions 100 may include generation component 112.

Access component 102 may be configured access to one or more visual information defining visual content. Visual information may define the visual content in a particular projection. Visual content may refer to media content that may be observed visually. Visual content may include one or more of an image, a sequence of images, a frame of a video, a video, and/or other visual content. For example, visual content may include one or more of an image, a video, and/or other visual content. Visual content may include spherical visual content. Spherical visual content may include visual content obtained by a spherical capture. Spherical visual content may include 360 degrees or less than 360 degrees capture of visual content at one or more locations.

Access component 102 may access one or more visual information from one or more storage locations. A storage location may include electronic storage 12, electronic storage of one or more capture devices (not shown in FIG. 1), and/or other locations. Access component 102 may be configured to access visual information defining one or more visual content during acquisition of the visual information and/or after acquisition of the visual information by one or more capture devices. For example, access component 102 may access visual information defining a video while the video is being captured by one or more capture devices. Access component 102 may access visual information defining a video after the video has been captured and stored in memory (e.g., electronic storage 12, etc.).

Figure 3:
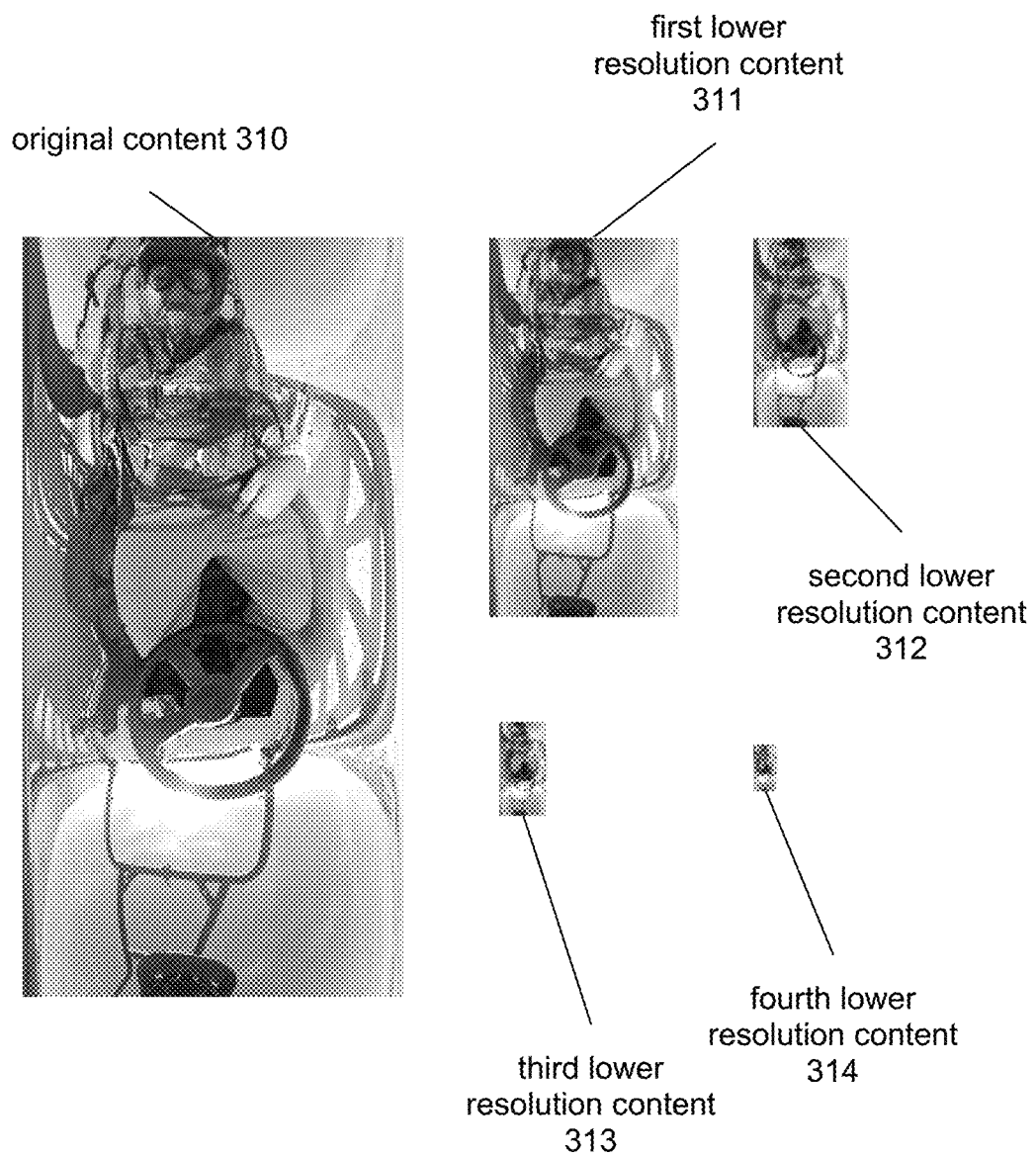
FIG. 3 illustrates an examples of visual content and lower resolution versions of the visual content.

Access component 102 may access first visual information, second visual information, and/or other visual information. The first visual information may define the visual content in one or more projections. Projections may determine how visual content may be presented on a plane, a curved surface, and/or other shapes. Projections may include a cylindrical projection, Mercator projection, Miller projection, equirectangular projection, Lambert cylindrical equal area projection, azimuthal projection, rectilinear projection, stereographic projection, fisheye projection, equisolid projection, orthographic projection, cubic projection, sinusoidal projection, transverse mercator projection, Pannini projection, and/or other projections. In some implementations, the first visual information may define the visual content in an equirectangular projection and/or other projections. For example, first visual information may define original content 310 (shown in FIG. 3). Original content 310 may include a representation of visual content in an equirectangular projection. In some implementations, the visual content may include a video and original content 310 may include a frame of the video. In some implementations, the visual content may include spherical visual content.

The second visual information may define one or more lower resolution versions of the visual content. Lower resolution versions of the visual content may be characterized by smaller number of pixels then the original version of the visual content. Lower resolution versions of the visual content may be anti-aliased. For example, referring to FIG. 3, second visual information may define first lower resolution content 311, second lower resolution content 312, third lower resolution content 313, fourth lower resolution content 314, and/or other lower resolution contents. Lower resolution versions of original content 310 may be characterized by successively smaller resolutions (e.g., in width and height). For example, lower resolution versions of original content 310 may be characterized by half the resolution (in width and height) of the prior version of the visual content. Other reductions in resolutions of lower resolution versions of the visual content are contemplated. In some implementations, the final lower resolution version of the visual content may be characterized by a width resolution of one and/or a height resolution of one.

Lower resolution versions of the visual content may be defined in the same projection as the original version of the visual content. For example, first lower resolution content 311, second lower resolution content 312, third lower resolution content 313, fourth lower resolution content 314, and/or other lower resolution contents may include representations of the visual content in an equirectangular projection.

Figure 4:
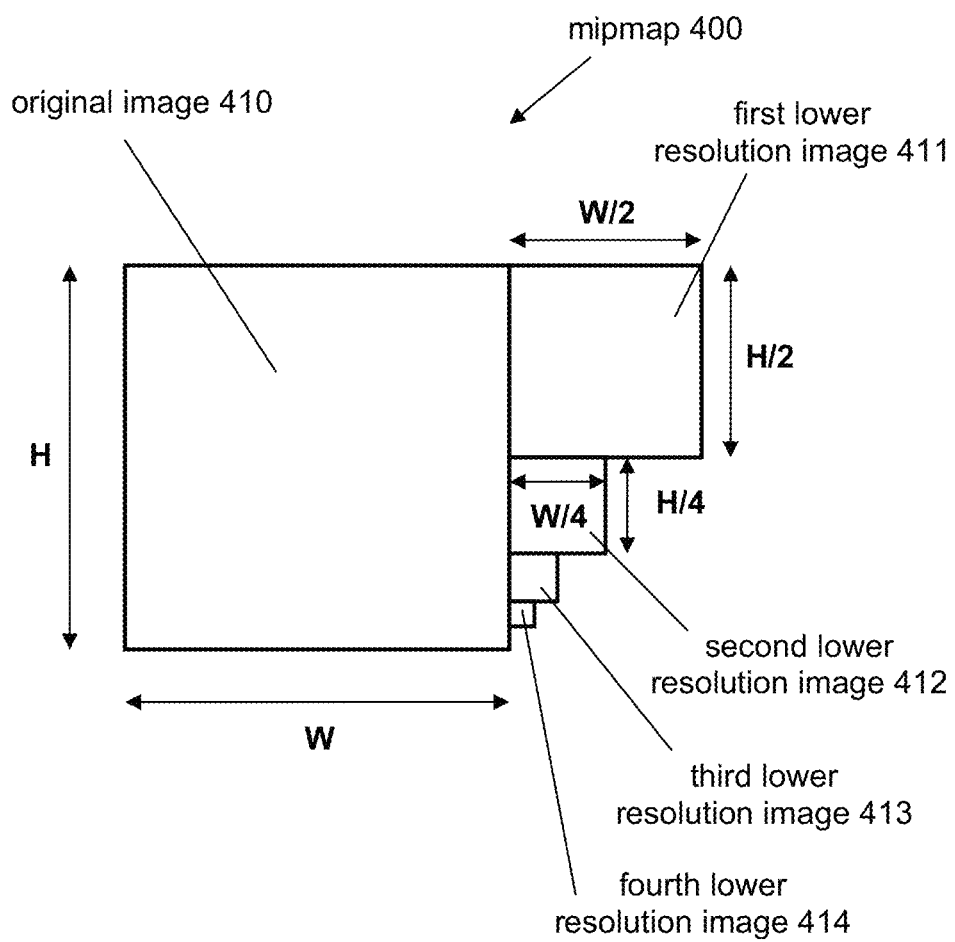
FIG. 4 illustrates an example of images stored in a mipmap.

In some implementations, one or more lower resolution versions of the visual content may be stored in one or more mipmaps. In some implementations, the original version of the visual content may be stored separately from one or more lower resolution versions of the visual content. In some implementations, the original version of the visual content may be stored in one or more mipmaps. For example, the original version of the visual content and one or more lower resolution versions of the visual content may be stored in mipmap 400 as shown in FIG. 4. Lower resolution versions of the visual content may be characterized by successively smaller resolutions (e.g., half the resolution in width and height).

Mipmap 400 may include original image 410. Original image 410 may be defined by a pixel height of H and a pixel width of W. The pixel height H and the pixel width W of original image 410 may be the same (e.g., a square image) or different (e.g., a rectangular image). Mipmap 400 may include first lower resolution image 411 (defined by a pixel height of H/2 and a pixel width of W/2), second lower resolution image 412 (defined by a pixel height of H/4 and a pixel width of W/4), third lower resolution image 413 (defined by a pixel height of H/8 and a pixel width of W/8), fourth lower resolution image 414 (defined by a pixel height of H/16 and a pixel width of W/16), and/or other lower resolution images. In some implementations, the final lower resolution version of original image 410 may be characterized by a width resolution of one and/or a height resolution of one.

In some implementations, generation component 112 may be configured to generate one or more lower resolution versions of the visual content in one or more projections. For example, generation component 112 may generate one or more lower resolution versions of original content 310 by successively reducing the height and width in half (and/or by other reduction value(s)). Generation component 112 may anti-alias one or more lower resolution versions of original content 310. Generation component 112 may generate one or more lower resolution versions of the visual content during the acquisition of the visual content, after the acquisition of the visual content, when system 10 detects that changes in projection of the visual content is desired, and/or at other times. Generation component 112 may generate one or more lower resolution versions of the visual content in the same projection as the original version of the visual content.

Figure 5:
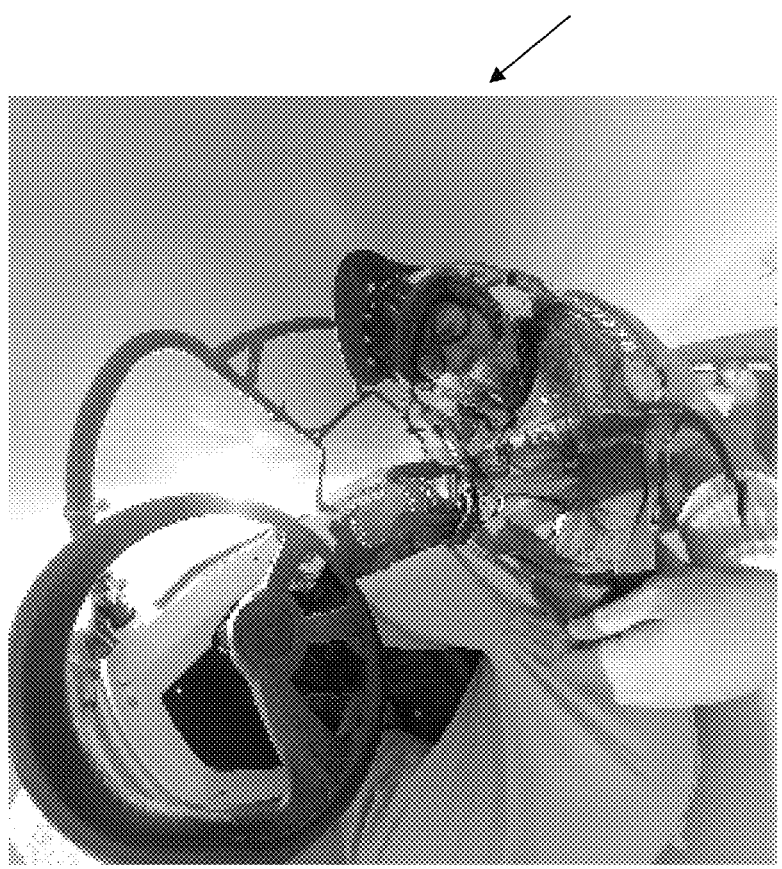
FIG. 5 illustrates an example of visual content transformed from one projection to another projection without using lower resolution versions of the visual content.

Transformation determination component 104 may be configured to determine one or more transformations of the visual content from one projection to another projection. For example, transformation component 104 may determine a transformation of original content 310 from one projection (e.g., equirectangular projection, etc.) to another projection. In some implementations, the other projection may include a stereographic projection and/or other projections. For example, FIG. 5 illustrates an example of visual content transformed from equirectangular projection to stereographic projection. Transformation determination component 104 may determine one or more transformations of the visual content from one projection to another projection based on user input (e.g., received via a graphical user interface of a visual application, etc.), based on operation of one or more visual applications, and/or other information.

The transformation of the visual content from one projection to another projection may be characterized by a transform function and/or other information. A transform function may define how one or more pixels of the visual content in one projection may be displayed in another projection. For example, a transformation of visual content from an equirectangular projection to a stereographic projection (as shown in FIG. 5) may be characterized by a two-dimensional mapping function: $(x_1, y_1) \rightarrow (x_2, y_2)$, where $x_1$ and $y_1$ represent x-coordinate and y-coordinate of a pixel in the equirectangular projection and $x_2$ and $y_2$ represent x-coordinate and y-coordinate of the pixel in the stereographic projection.

The transformation of the visual content from one projection to another projection may include one or more visual compressions of one or more portions of the visual content in the original projection. For example, transforming original content 310 in equirectangular projection to transformed spherical visual content A 500 in stereographic projection may include visual compressions of different portions of original content 310. Different portion of original content 310 may be visually compressed by different amounts. For example, a portion of original content 310 that will be transformed to a location closer to the center of transformed spherical visual content A 500 may be compressed by a greater amount than a portion of original content 310 that will be transformed to a location further away from the center of transformed spherical visual content A 500. Other different visual compressions of different portions of the visual content are contemplated.

Visual compression of original content 310 may create artifacts (e.g., aliasing) in transformed spherical visual content A 500. As shown in FIG. 5A, transformed spherical visual content A 500 may include aliasing (e.g., jagged edges). Amount of artifacts in transformed spherical visual content A 500 may increase with the amount of visual compression. For example, amounts of aliasing towards the center of transformed spherical visual content A 500 may be greater than amounts aliasing towards the edge of transformed spherical visual content A 500.

Visual compression component 106 may be configured to identify the one or more portions of the visual content in the first projection. For example, visual compression component 106 may identify different portions of original content 310. Visual compression component 106 may be configured to determine an amount of visual compression of the one or more portions of the visual content in the first projection. For example, visual compression component 106 may determine amounts of visual compression of the different portions of original content 310.

Selection component 108 may be configured to select one or more of the lower resolution versions of the visual content for the visual compression of the one or more portions. For example, selection component 108 may select one or more of first lower resolution content 311, second lower resolution content 312, third lower resolution content 313, fourth lower resolution content 314, and/or other lower resolution contents for the visual compression of different portions of original content 310. One or more lower resolution versions of the visual content may include one or more lower resolution versions of the portion(s) of the visual content in the first projection. For example, first lower resolution content 311, second lower resolution content 312, third lower resolution content 313, fourth lower resolution content 314, and/or other lower resolution contents may include lower resolution versions of the different portions of original content 310.

One or more lower resolution versions of the visual content selected for the visual compression of the one or more portions may include multiple versions having different resolutions. For example, first lower resolution content 311, second lower resolution content 312, third lower resolution content 313, fourth lower resolution content 314, and/or other lower resolution contents selected for the visual compression of different portions of original content 310 may have different resolutions. The resolution of first lower resolution content 311 may be greater than the resolution of second lower resolution content 312. The resolution of second lower resolution content 312 may be greater than the resolution of third lower resolution content 313. The resolution of third lower resolution content 313 may be greater than the resolution of fourth lower resolution content 314.

One or more lower resolution versions of the visual content may be selected for the visual compression of the one or more portions based on the amount of the visual compression of the one or more portions and/or other information. For example, selection component 108 may select one or more of first lower resolution content 311, second lower resolution content 312, third lower resolution content 313, fourth lower resolution content 314, and/or other lower resolution contents based on the amount of the visual compression of the different portions of original content 310.

In some implementations, one or more lower resolution versions of the visual content may be selected based on determinants of a Jacobian matrix of the transform function. Determinants of a Jacobian matrix of the transform function may provide a measure of the amounts of the visual compression (and/or visual stretching) of the one or more portions of the visual content. A Jacobian matrix of the transform function $(x_1, y_1) \rightarrow (x_2, y_2)$ may be given by $J(x,y)$ as shown in FIG. 8A. A determinant of the Jacobian matrix of the transform function $(x_1, y_1) \rightarrow (x_2, y_2)$ may be given by: $\det(J(x,y))$ as shown in FIG. 8B.

A value of $\det(J(x,y))$ greater or equal to 1 may correspond to no visual compression for the corresponding portions of the visual content. For portions of the visual content with no visual compression, selection component 108 may not select lower resolution versions of the visual content. Instead, portions of the visual content with no visual compression may be transformed using the original version of the visual content (e.g., original content 310).

A value of $\det(J(x,y))$ less than 1 may correspond to different amounts of visual compressions for the corresponding portions of the visual content. Smaller values of $\det(J(x,y))$ may correspond to greater amounts of visual compressions for the corresponding portions of the visual content. For example, a value of $\det(J(x,y))$ equal to 0.9 may correspond to some amount of visual compression for the corresponding portions of the visual content. For these portions, selection component 108 may select a lower resolution version of the visual content that is close in size to the original version of the visual content. A value of $\det(J(x,y))$ equal to 0.5 may correspond to a greater amount of visual compression for the corresponding portions of the visual content. For these portions, selection component 108 may select a lower resolution version of the visual content that is smaller than the lower resolution version of the visual content selected for the portions with $\det(J(x,y))$ equal to 0.9.

In some implementations, selection component 108 may select one or more lower resolution versions of the visual content using the following criteria:

$$\text{level} = \frac{-0.5 \log(\det(J(x, y)))}{\log(2)}$$

Level may indicate which of the lower resolution versions of the visual content may be selected by selection component 108. For example, level may indicate which level of the lower resolution images contained in mipmap 400 may be selected by selection component 108. Level value of zero may correspond original image 410 (e.g., base image of mipmap 400). Level value of one may correspond to first lower resolution image 411. Level value of two may correspond to second lower resolution image 412. Level value of three may correspond to third lower resolution image 413. Level value of four may correspond to fourth lower resolution image 414. Other values of level and selection of other lower resolution versions of the visual content are contemplated.

For non-integer level values, (e.g., level value of 2.4, etc.), selection component 108 may select a lower resolution version corresponding to a closest integer value (e.g., 2, etc.), a lower resolution version corresponding to a lower integer value, (e.g., 2, etc.), a lower resolution version corresponding to a higher integer value (e.g., 3, etc.), both a lower resolution version corresponding to a lower integer value, (e.g., 2, etc.) and a lower resolution version corresponding to a higher integer value (e.g., 3, etc.), and/or other lower resolution versions.

Figure 6A:
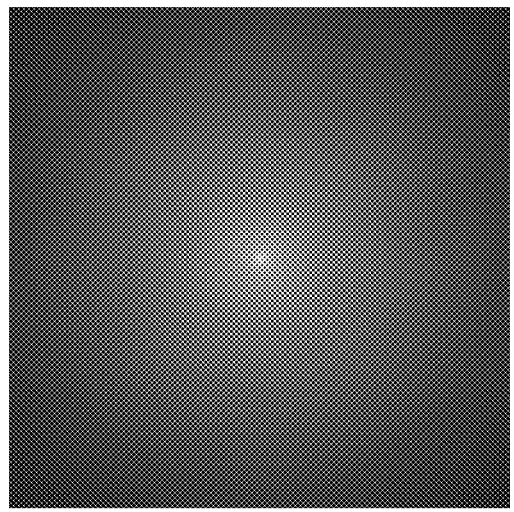
FIG. 6A illustrates an example of real values for levels of lower resolution versions of the visual content.
Figure 6B:
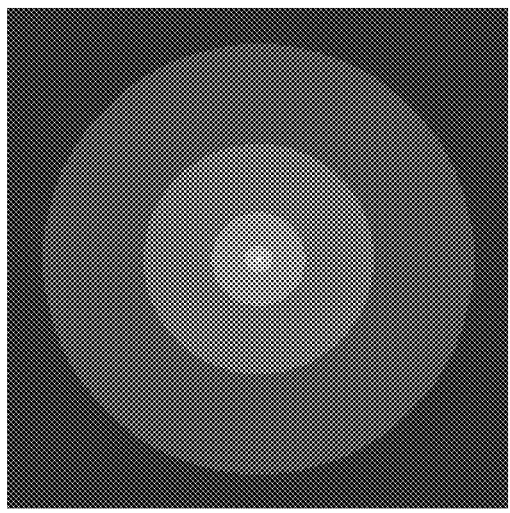
FIG. 6B illustrates an example of integer values for levels of lower resolution versions of the visual content.

FIG. 6A illustrates exemplary real level values determined for transformation of original content 310 from an equirectangular projection to a stereographic projection. Darker portions of FIG. 6A may correspond to lower level values and lighter portions of FIG. 6A may correspond to higher level values. FIG. 6B illustrates exemplary integer level values determined for transformation of original content 310 from an equirectangular projection to a stereographic projection. FIG. 6B may represent closest integer level values or other integer level values. The darkest portion (edge portion) of FIG. 6B may correspond to a level value of two. The lightest portion (center portion) of FIG. 6B may correspond to a level value of seven. Other level values are contemplated.

In some implementations, one or more lower resolution versions of the visual content may be selected based on a first singular value (SV1) and a second singular value (SV2) of the Jacobian matrix of the transform function. Singular values of the Jacobian matrix of the transform function may provide measures of the amounts of the visual compression of the one or more portions of the visual content in multiple directions. For example, a portion of the visual content may be stretched in one direction and compressed in a perpendicular direction. In a conformal projection, SV1 may be equal to SV2. Selection component 108 may select one or more lower resolution versions of the visual content using the following criteria:

$$\text{level} = \frac{-\log(\min(SV1, SV2))}{\log(2)}$$

Transformation component 110 may be configured to transform the visual content from the first projection to the second projection. The visual content may be transformed from the first projection to the second projection using one or more of the lower resolution versions of the portion(s) of the visual content selected for the visual compression of the portion(s), and/or other information. For example, for a portion of original content 310, select component 308 may have selected second lower resolution content 312 and/or third lower resolution content 313. Transformation component 110 may transform this portion of original content 310 using the corresponding portion of second lower resolution content 312 and/or the corresponding portion of third lower resolution content 313. In some implementations, one or more lower resolution versions of the portions may be scaled up or down. For example, transformation component 110 may transform the above portion by scaling up the corresponding portion of third lower resolution content 313 and/or scaling down the corresponding portion of second lower resolution content 313.

In some implementations, transformation component 110 may transform the visual content using one or more interpolations of two or more lower resolution versions of the visual content. For example, transformation component 110 may transform the above using an interpolation of the corresponding portion of second lower resolution content 312, the corresponding portion of third lower resolution content 313, and/or the corresponding portions of other lower resolution versions of original content 310.

Figure 7:
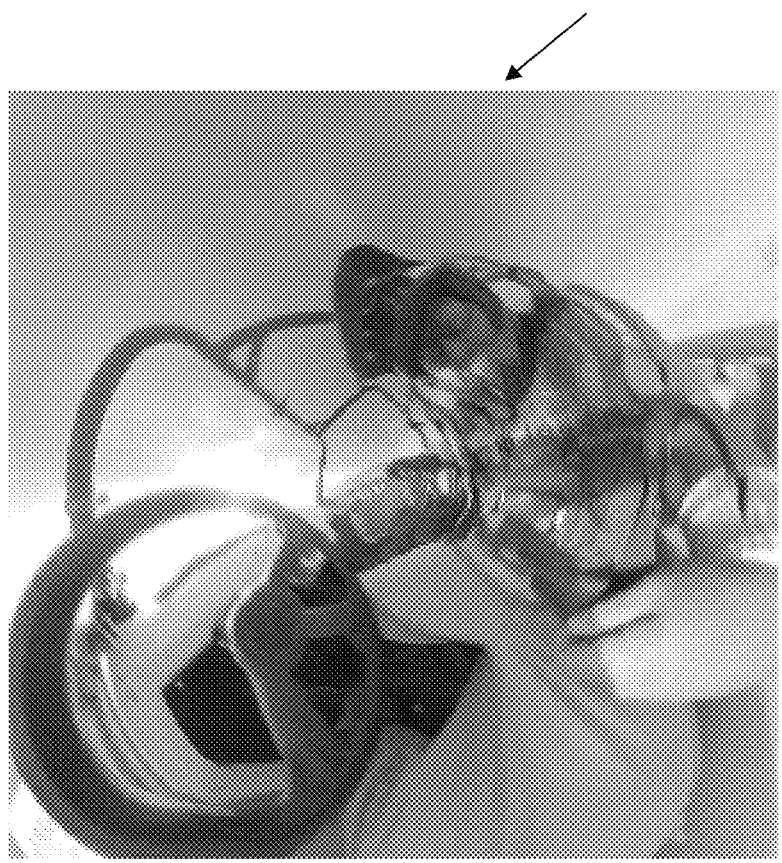
FIG. 7 illustrates an example of visual content transformed from one projection to another projection using lower resolution versions of the visual content.

Using lower resolution versions of visual content for transformation of the visual content may reduce the amount of artifacts in the transformed visual content. For example, FIG. 7 illustrates transformed spherical visual content B 700. Transformed spherical visual content B 700 may have been transformed from original content 310 using one or more lower resolution versions of original content 310 (e.g., first lower resolution content 311, second lower resolution content 312, third lower resolution content 313, fourth lower resolution content 314, and/or other lower resolution contents). Transformed spherical visual content B 700 may include less artifacts (e.g., aliasing) than transformed spherical visual content A 500.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although processor 11 and electronic storage 12 are shown to be connected to an interface 13 in FIG. 1, any communication medium may be used to facilitate interaction between any components of system 10. One or more components of system 10 may communicate with each other through hard-wired communication, wireless communication, or both. For example, one or more components of system 10 may communicate with each other through a network. For example, processor 11 may wirelessly communicate with electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIG. 1 as a single entity, this is for illustrative purposes only. In some implementations, processor 11 may comprise a plurality of processing units. These processing units may be physically located within the same device, or processor 11 may represent processing functionality of a plurality of devices operating in coordination. Processor 11 may be configured to execute one or more components by software; hardware; firmware; some combination of software, hardware, and/or firmware; and/or other mechanisms for configuring processing capabilities on processor 11.

It should be appreciated that although computer components are illustrated in FIG. 1 as being co-located within a single processing unit, in implementations in which processor 11 comprises multiple processing units, one or more of computer program components may be located remotely from the other computer program components.

The description of the functionality provided by the different computer program components described herein is for illustrative purposes, and is not intended to be limiting, as any of computer program components may provide more or less functionality than is described. For example, one or more of computer program components 102, 104, 106, 108, 110 and/or 112 may be eliminated, and some or all of its functionality may be provided by other computer program components. As another example, processor 11 may be configured to execute one or more additional computer program components that may perform some or all of the functionality attributed to one or more of computer program components 102, 104, 106, 108, 110 and/or 112 described herein.

The electronic storage media of electronic storage 12 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). Electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 12 may be a separate component within system 10, or electronic storage 12 may be provided integrally with one or more other components of system 10 (e.g., processor 11). Although electronic storage 12 is shown in FIG. 1 as a single entity, this is for illustrative purposes only. In some implementations, electronic storage 12 may comprise a plurality of storage units. These storage units may be physically located within the same device, or electronic storage 12 may represent storage functionality of a plurality of devices operating in coordination.

Figure 2:
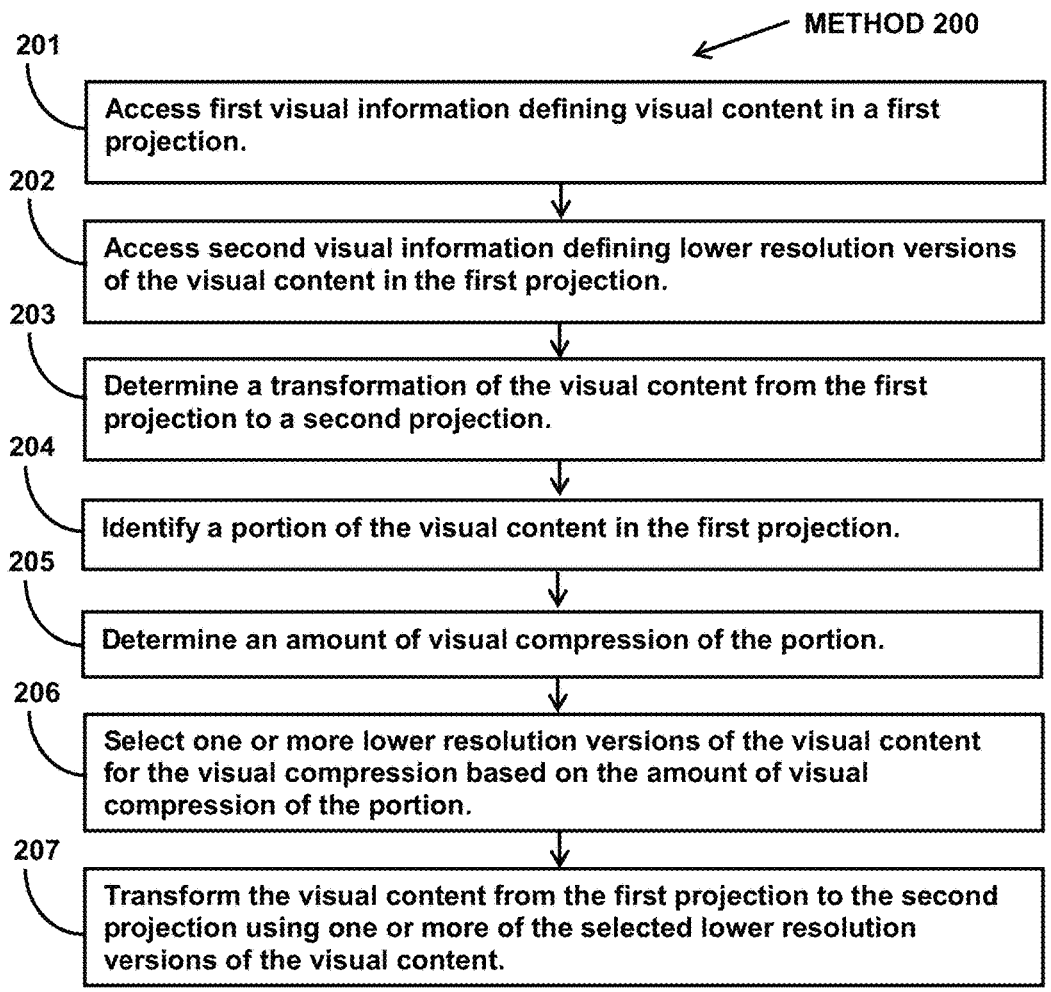
FIG. 2 illustrates a method for changing projection of visual content using lower resolution versions of the visual content.

FIG. 2 illustrates method 200 for changing projection of visual content lower resolution versions of the visual content. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, first visual information may be accessed. The first visual information may define visual content in a first projection. In some implementations, operation 201 may be performed by a processor component the same as or similar to access component 102 (shown in FIG. 1 and described herein).

At operation 202, second visual information may be accessed. The second visual information may define lower resolution versions of the visual content in the first projection. In some implementations, operation 202 may be performed by a processor component the same as or similar to access component 102 (shown in FIG. 1 and described herein).

At operation 203, a transformation of the visual content from the first projection to a second projection may be determined. The transformation of the visual content from the first projection to the second projection may include a visual compression of a portion of the visual content in the first projection. In some implementations, operation 203 may be performed by a processor component the same as or similar to transformation determination component 104 (shown in FIG. 1 and described herein).

At operation 204, the portion of the visual content in the first projection may be identified. In some implementations, operation 204 may be performed by a processor component the same as or similar to visual compression component 106 (shown in FIG. 1 and described herein).

At operation 205, an amount of visual compression of the portion may be determined. In some implementations, operation 205 may be performed by a processor component the same as or similar to visual compression component 106 (shown in FIG. 1 and described herein).

At operation 206, one or more lower resolution versions of the visual content may be selected for the visual compression of the portion. One or more lower resolution versions of the visual content may be selected based on the amount of visual compression of the portion. One or more lower resolution versions of the visual content may include one or more lower resolution versions of the portion of the visual content in the first projection. In some implementations, operation 206 may be performed by a processor component the same as or similar to selection component 108 (shown in FIG. 1 and described herein).

At operation 207, the visual content may be transformed from the first projection to the second projection using one or more of the selected lower resolution versions of the visual content. Using one or more of the selected lower resolution versions of the visual content may include using one or more lower resolution versions of the portion of the visual content in the first projection. In some implementations, operation 207 may be performed by a processor component the same as or similar to transformation component 110 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for changing projection of visual content, the system comprising:
   one or more physical processors configured by machine-readable instructions to:
      access first visual information defining the visual content in a first projection;
      access second visual information defining lower resolution versions of the visual content in the first projection;
      determine a transformation of the visual content from the first projection to a second projection, the transformation of the visual content from the first projection to the second projection including a visual compression of a portion of the visual content in the first projection;
      identify the portion of the visual content in the first projection;
      determine an amount of the visual compression of the portion of the visual content in the first projection;
      select one or more of the lower resolution versions of the visual content for the visual compression of the portion based on the amount of the visual compression of the portion, the one or more of the lower resolution versions of the visual content including one or more lower resolution versions of the portion of the visual content in the first projection; and
      transform the visual content from the first projection to the second projection using the one or more of the lower resolution versions of the portion of the visual content selected for the visual compression of the portion.

2. The system of claim 1, wherein the visual content includes one or both of an image and a video.

3. The system of claim 1, wherein the lower resolution versions of the visual content in the first projection are stored in a mipmap.

4. The system of claim 1, wherein the first projection includes an equirectangular projection.

5. The system of claim 4, wherein the second projection includes a stereographic projection.

6. The system of claim 1, wherein the transformation is characterized by a transform function, and the one or more of the lower resolution versions of the visual content are further selected based on a determinant of a Jacobian matrix of the transform function.

7. The system of claim 1, wherein the transformation is characterized by a transform function, and the one or more of the lower resolution versions of the visual content are further selected based on a first singular value and a second singular value of the Jacobian matrix of the transform function.

8. The system of claim 1, wherein the one or more of the lower resolution versions of the visual content selected for the visual compression of the portion includes a first version having a first resolution and a second version having a second resolution, the first resolution being greater than the second resolution, and the visual compression of the portion includes an interpolation of the first version and the second version.

9. The system of claim 1, wherein the one or more physical processors are further configured to generate the lower resolution versions of the visual content in the first projection.

10. A method for changing projection of visual content, the method comprising:
accessing first visual information defining the visual content in a first projection;
accessing second visual information defining lower resolution versions of the visual content in the first projection;
determining a transformation of the visual content from the first projection to a second projection, the transformation of the visual content from the first projection to the second projection including a visual compression of a portion of the visual content in the first projection;
identifying the portion of the visual content in the first projection;
determining an amount of the visual compression of the portion of the visual content in the first projection;
selecting one or more of the lower resolution versions of the visual content for the visual compression of the portion based on the amount of the visual compression of the portion, the one or more of the lower resolution versions of the visual content including one or more lower resolution versions of the portion of the visual content in the first projection; and
transforming the visual content from the first projection to the second projection using the one or more of the lower resolution versions of the portion of the visual content selected for the visual compression of the portion.

11. The method of claim 10, wherein the visual content includes one or both of an image and a video.

12. The method of claim 10, wherein the lower resolution versions of the visual content in the first projection are stored in a mipmap.

13. The method of claim 10, wherein the first projection includes an equirectangular projection.

14. The method of claim 13, wherein the second projection includes a stereographic projection.

15. The method of claim 10, wherein the transformation is characterized by a transform function, and the one or more of the lower resolution versions of the visual content are further selected based on a determinant of a Jacobian matrix of the transform function.

16. The method of claim 10, wherein the transformation is characterized by a transform function, and the one or more of the lower resolution versions of the visual content are further selected based on a first singular value and a second singular value of the Jacobian matrix of the transform function.

17. The method of claim 10, wherein the one or more of the lower resolution versions of the visual content selected for the visual compression of the portion includes a first version having a first resolution and a second version having a second resolution, the first resolution being greater than the second resolution, and the visual compression of the portion includes an interpolation of the first version and the second version.

18. The method of claim 10, further comprising generating the lower resolution versions of the visual content in the first projection.

19. A system for changing projection of visual content, the system comprising:
one or more physical processors configured by machine-readable instructions to:
access first visual information defining the visual content in an equirectangular projection;
access second visual information defining lower resolution versions of the visual content in the equirectangular projection;
determine a transformation of the visual content from the equirectangular projection to a stereographic projection, the transformation of the visual content from the equirectangular projection to the stereographic projection including a visual compression of a portion of the visual content in the equirectangular projection;
identify the portion of the visual content in the equirectangular projection;
determine an amount of the visual compression of the portion of the visual content in the equirectangular projection;
select one or more of the lower resolution versions of the visual content for the visual compression of the portion based on the amount of the visual compression of the portion, the one or more of the lower resolution versions of the visual content including one or more lower resolution versions of the portion of the visual content in the equirectangular projection; and
transform the visual content from the equirectangular projection to the stereographic projection using the one or more of the lower resolution versions of the portion of the visual content selected for the visual compression of the portion.

20. The system of claim 19, wherein the one or more of the lower resolution versions of the visual content selected for the visual compression of the portion includes a first version having a first resolution and a second version having a second resolution, the first resolution being greater than the second resolution, and the visual compression of the portion includes an interpolation of the first version and the second version.

* * * * *